S. J. CLULEE.
SPECTACLE FRAME.
APPLICATION FILED NOV. 8, 1920.
1,384,303.
Patented July 12, 1921.
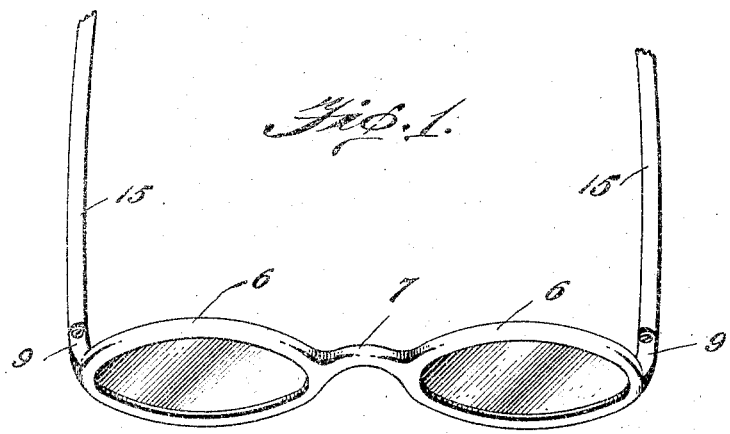
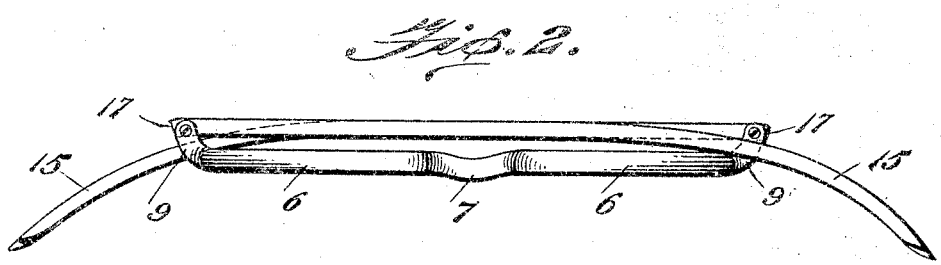
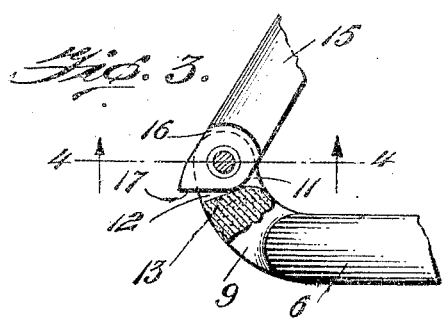
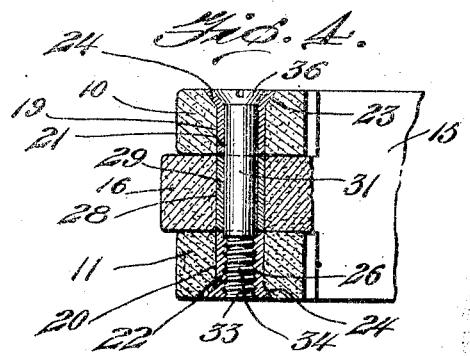
Inventor
Stephen J. Clulee
By Horatio E. Bellows
Attorney

UNITED STATES PATENT OFFICE.

STEPHEN J. CLULEE, OF ATTLEBORO, MASSACHUSETTS, ASSIGNOR TO BAY STATE OPTICAL COMPANY, A CORPORATION OF MAINE.

SPECTACLE-FRAME.

1,384,303.  Specification of Letters Patent.  Patented July 12, 1921.

Application filed November 3, 1920. Serial No. 422,440.

*To all whom it may concern:*

Be it known that I, STEPHEN J. CLULEE, a citizen of the United States, residing at Attleboro, in the county of Bristol and State of Massachusetts, have invented certain new and useful Improvements in Spectacle-Frames, of which the following is a specification.

My invention relates to non-metallic spectacle frames wherein the lens holding portions of the frame together with the temples are of large cross sectional dimensions to have the appearance of heaviness at present in vogue in this type of spectacles.

Heretofore in this class of spectacles it has been attempted to pivotally connect the temples with the body of the frame by means of leaf hinges or hinges comprising hinge plates. This involved affixing to the body one of the plates of the hinge at one side of the eye opening of the frame, and affixing the other plate upon the inner face of the temple. This location required broad lateral extensions at the outer sides of the eye openings, thus prolonging the length of the frame body excessively and disproportionately to the breadth of the wearer's head above the ears. Furthermore it was necessary in affixing both plates of the hinges to the body and to the temple to expose the ends of the attaching pins or rivets to the observer from the front and side of the structure. The exposed position of the hinge and hinge plates furthermore subjected these metallic parts to corrosion and to such accumulations of foreign matter as to interfere with the pivotal action of the parts. The described plate hinge construction excessively spaced the engaged ends of the temples from the frame body when the spectacles were folded so as to unduly increase the bulk of the structure for incasement.

The essential objects of the present invention are to overcome the disadvantages hereinabove enumerated, and to conceal the hinge members.

To the above ends essentially my invention consists in such parts and in such combinations of parts as fall within the scope of the appended claims.

In the accompanying drawings which form a part of this invention—

Figure 1 is a perspective view from above of a pair of spectacles embodying my invention, portions of the temples being shown broken away, Fig. 2, a top plan view of the spectacle in folded position, Fig. 3, an enlarged plan of one end of the frame and the attached end of one of the temples, one of the ears of the frame being shown broken away, and Fig. 4, a section on line 4—4 of Fig. 3.

Like reference characters indicate like parts throughout the views.

The embodiment of my invention herein shown comprises the rim portions 6 and bridge portion 7 of a spectacle body formed in one piece of non-metallic material such as xylonite. Upon the ends of the frame are rearwardly directed portions of fingers 9 provided with bifurcated ends consisting of upper and lower ears 10 and 11. The forward portion of the resultant cavity 12 between the ears is preferably an inclined face 13. Each temple 15 is of the same material as the bridge and has upon its inner end a central projecting flattened lug 16 provided with an inclined end face 17 adapted to register with the stop face 13 when the temple is open.

In vertical openings 19 and 20 in the ears 10 and 11 respectively are frictionally seated tubes 21 and 22 respectively which are driven tightly into the openings; and for increasing frictional engagement the exterior surfaces of these tubes or sleeves may be rough. The openings 19 and 20 are preferably enlarged near their ends forming inclined annular recesses 23 to accommodate flaring shoulders or enlargements 24 of the sleeves. The interior of the sleeve 22 is provided with a thread 26. The tubes 21 and 22 are in alinement with each other. The lug 16 is also provided with a vertical opening 28 in alinement with the openings 19 and 20, in which opening is a preferably exteriorly roughened cylindrical sleeve 29 maintained in position by friction.

A screw is provided for each temple comprising a smooth shank 31 extending through the members 10 and 16, also an end portion 33 provided with a thread 34 adapted to register in the thread 26 of the tube 22. The screw has a head 36 seated in the portion 24 of the tube 21. Each screw shank 31 is loose in its sleeve 28 so as to permit pivotal movement of the temple.

I claim:—

1. In spectacles of the type set forth, a non metallic frame comprising a body and ears supported by the body provided with openings, metallic tubes in the openings, metallic pivot members extending through the tubes, and temples mounted on the pivot members.

2. In spectacles of the type set forth, a non metallic frame comprising a body and ears supported by the body provided with openings, metallic pivot members in the openings, non metallic temples, and metallic tubes carried by the temples loosely embracing the pivot members.

3. In spectacles of the type set forth, a non metallic frame comprising a body and ears supported on the body provided with openings, metallic tubes fast in the openings, non metallic temples, lugs on the temples between the ears provided with openings, metallic tubes fast in the last mentioned openings, and metallic pivot members in all the tubes.

4. In spectacles of the type set forth, a non metallic frame comprising a body and upper and lower ears supported by the ends of the body provided with openings, tubes fast in the openings of the upper ears provided with enlarged ends, tubes in the openings in the lower ears provided with internal threads, non metallic temples, lugs on the temples between the upper and lower ears provided with openings, tubes in the last mentioned openings, and metallic pivot members comprising shanks extending through all the tubes provided with threads engaging the threads in the tubes, and heads seated in the enlarged ends of the tubes.

5. In spectacles of the type set forth, a non metallic frame comprising a body and two ears supported by the body provided with openings, metallic tubes fast in the openings, one of said tubes being provided with an internal thread, a metallic pivot member in the tubes provided with a thread engaging the first thread, a non metallic temple, and a tube carried by the temple loose on the pivot member.

In testimony whereof I have affixed my signature.

STEPHEN J. CLULEE.